United States Patent
Knoeppel

(10) Patent No.: US 11,009,260 B2
(45) Date of Patent: May 18, 2021

(54) SYSTEM AND METHOD FOR ACCELLERATED HEATING OF A FLUID

(71) Applicant: A.O. SMITH CORPORATION, Milwaukee, WI (US)

(72) Inventor: Ray Oliver Knoeppel, Hartland, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 29 days.

(21) Appl. No.: 16/243,276

(22) Filed: Jan. 9, 2019

(65) Prior Publication Data
US 2019/0212035 A1     Jul. 11, 2019

Related U.S. Application Data

(60) Provisional application No. 62/615,171, filed on Jan. 9, 2018.

(51) Int. Cl.
*G06F 1/20* (2006.01)
*F24H 9/20* (2006.01)
(Continued)

(52) U.S. Cl.
CPC ............ *F24H 9/2021* (2013.01); *F24H 1/202* (2013.01); *F24H 9/02* (2013.01); *F24H 9/1818* (2013.01);
(Continued)

(58) Field of Classification Search
CPC ....................................................... G06F 1/206
(Continued)

(56) References Cited

U.S. PATENT DOCUMENTS 3,065,764 A   11/1962  Lyle
5,193,138 A    3/1993  Richey et al.
(Continued)

OTHER PUBLICATIONS

Bradford White Water Heaters, "Performance Package: LCD Digital Control and Integrated Mixing Device," <https://www.bradfordwhite.com/performance-package-lcd-digital-control-and-integrated-mixing-device> website publicly available at least as early as Aug. 8, 2013.
(Continued)

*Primary Examiner* — Suresh Suryawanshi
(74) *Attorney, Agent, or Firm* — Michael Best & Friedrich LLP

(57) ABSTRACT

A water heating system including a tank, a first heating element, a second heating element, a first temperature sensor, a second temperature sensor, a controller having an electronic processor and a memory. The controller is configured to determine an output temperature setpoint, determine whether a period of expected high water demand is approaching, and in response to determining that the period of expected high water demand is approaching, activate the second heating element. The controller is further configured to deactivate the second heating element when a second temperature sensed by the second temperature sensor crosses a second temperature threshold, activate the first heating element when the second temperature crosses the second temperature threshold, and deactivate the first heating element. Wherein the first temperature threshold is lower than the second temperature threshold and the first and second temperature thresholds are higher than the output temperature setpoint.

19 Claims, 4 Drawing Sheets

(51) Int. Cl.
*F24H 1/20* (2006.01)
*F24H 9/02* (2006.01)
*G05B 15/02* (2006.01)
*G01D 3/028* (2006.01)
*G01D 3/08* (2006.01)
*F24H 9/18* (2006.01)

(52) U.S. Cl.
CPC .............. *G01D 3/028* (2013.01); *G01D 3/08* (2013.01); *G05B 15/02* (2013.01); *G06F 1/206* (2013.01)

(58) Field of Classification Search
USPC ........................................................ 700/300
See application file for complete search history.

(56) References Cited

U.S. PATENT DOCUMENTS

| | | | |
|---|---|---|---|
| 5,808,277 A | 9/1998 | Dosani et al. | |
| 6,242,720 B1* | 6/2001 | Wilson | F24H 9/2021 219/486 |
| 6,374,046 B1* | 4/2002 | Bradenbaugh | F24H 9/2021 219/492 |
| 6,633,726 B2 | 10/2003 | Bradenbaugh | |
| 8,720,388 B2 | 5/2014 | Beyerle et al. | |
| 9,188,363 B2* | 11/2015 | Buescher | F24H 9/2021 |
| 9,268,342 B2 | 2/2016 | Beyerle et al. | |
| 10,072,853 B2* | 9/2018 | Chaudhry | F24D 17/0021 |
| 2003/0091091 A1* | 5/2003 | Patterson | G01K 7/42 374/141 |
| 2004/0069768 A1* | 4/2004 | Patterson | G01K 7/42 219/492 |
| 2005/0275993 A1* | 12/2005 | Phillips | H01H 47/002 361/103 |
| 2006/0013572 A1* | 1/2006 | Phillips | F24H 9/2021 392/459 |
| 2006/0013573 A1* | 1/2006 | Phillips | F24H 9/1818 392/459 |
| 2006/0257127 A1* | 11/2006 | Patterson | F24D 19/1051 392/441 |
| 2007/0170273 A1 | 7/2007 | McIllwain | |
| 2007/0210067 A1* | 9/2007 | Patterson | F24H 9/2014 219/481 |
| 2007/0245980 A1* | 10/2007 | Phillips | F24H 9/2021 122/14.22 |
| 2007/0246552 A1* | 10/2007 | Patterson | F24H 9/2014 236/21 B |
| 2007/0246556 A1* | 10/2007 | Patterson | F24H 9/2014 237/8 A |
| 2007/0246557 A1* | 10/2007 | Phillips | F24H 9/2014 237/8 R |
| 2007/0248143 A1* | 10/2007 | Phillips | G01K 1/20 374/141 |
| 2007/0248340 A1* | 10/2007 | Phillips | F24H 9/2014 392/441 |
| 2010/0077969 A1 | 4/2010 | Threatt et al. | |
| 2011/0123179 A1* | 5/2011 | Roetker | F24D 17/0031 392/441 |
| 2011/0282499 A1* | 11/2011 | Sowani | F24H 9/2078 700/282 |
| 2013/0200168 A1* | 8/2013 | Buescher | H05B 1/0283 237/8 A |
| 2013/0263843 A1* | 10/2013 | Kreutzman | F24D 11/004 126/615 |
| 2013/0266296 A1* | 10/2013 | Kreutzman | F24D 19/1048 392/308 |
| 2014/0175183 A1* | 6/2014 | Phillips | F24H 9/2014 236/20 R |
| 2014/0229022 A1* | 8/2014 | Deivasigamani | G05D 7/0629 700/282 |
| 2014/0348493 A1* | 11/2014 | Kreutzman | F24H 1/0018 392/307 |
| 2015/0184889 A1* | 7/2015 | Shaffer | F24H 9/2021 392/308 |
| 2015/0354833 A1* | 12/2015 | Kreutzman | H05B 3/48 392/308 |
| 2018/0010810 A1* | 1/2018 | Boivin | F24H 1/202 |
| 2018/0051907 A1* | 2/2018 | Boros | F24H 1/181 |
| 2018/0080683 A1* | 3/2018 | Branecky | F24H 9/2021 |
| 2018/0238563 A1* | 8/2018 | Stepa | G05F 1/00 |
| 2018/0266701 A1* | 9/2018 | Sofer | F24D 17/0063 |

OTHER PUBLICATIONS

Honeywell, "¾" DirectConnect Water Heater Mixing Valve Kit," <https://www.plumbersstock.com/honeywell-amx300tlf-amx-mixing-valve-kit.html> website publicly available at least as early as Oct. 10, 2017.

Petrillo, "Safety First," Reeves Journal, <https://www.reevesjournal.com/articles/85409-safety-first>, dated Aug. 1, 2006.

"Smart Water Heater Control," Appliance Manufacturer Magazine, 51(7), dated Jul. 2003.

International Search Report and Written Opinion for Application No. PCT/US2019/012858 dated May 13, 2019 (13 pages).

* cited by examiner

|  | First Draw | First Hour | Average Tank Temp During First 1Hr/40min | Top of Tank Temperature after 3rd Draw (Avg T1,T2,T3) |
|---|---|---|---|---|
| First Method (125F) | 35.0 | 61.6 | 104.9 | 123.6 |
| Accelerated Heating Mode (170F/135F) | 46.9 | 77.4 | 114.5 | 125.0 |
| Extra-accelerated Heating Mode (163F/155F) | 55.2 | 81.4 | 123.1 | 149.2 |

FIG. 5

SYSTEM AND METHOD FOR ACCELLERATED HEATING OF A FLUID

RELATED APPLICATIONS

The present application claims priority to U.S. Patent Provisional Application No. 62/615,171, filed on Jan. 9, 2018, the entire contents of which are hereby incorporated by reference.

FIELD

Embodiments relate to water heaters.

SUMMARY

Storage water heaters heat a fluid (for example, water) in the storage tank. Typically, a user sets a water temperature setpoint for the temperature at which water is desired from the water heater. The amount of water (for example, water at the water temperature setpoint) available to the user in a single water draw may vary based on the water heater's ability to rapidly heat water, and on the temperature setpoint. For example, more water may be available at a single water draw when the temperature setpoint is lower since the water heater may be able to heat the water to the temperature setpoint more rapidly. Storing water at a higher temperature than the temperature threshold may allow the water heater to provide greater volume of water at the temperature setpoint. However, maintaining the water stored at the higher temperature may result in excess energy usage when no water is drawn from the water heater, and may reduce the lifetime of the water heater. Thus, a method for accelerated heating of a fluid.

One embodiment provides a water heating system including a tank, a first heating element, a second heating element, a first temperature sensor, a second temperature sensor, a controller having an electronic processor and a memory. The controller is configured to determine an output temperature setpoint, determine whether a period of expected high water demand is approaching, and in response to determining that the period of expected high water demand is approaching, activate the second heating element. The controller is further configured to deactivate the second heating element when a second temperature sensed by the second temperature sensor crosses a second temperature threshold, activate the first heating element when the second temperature crosses the second temperature threshold, and deactivate the first heating element. Wherein the first temperature threshold is lower than the second temperature threshold and the first and second temperature thresholds are higher than the output temperature setpoint.

Another embodiment provides a method of heating a fluid within a tank. The method includes determining, via an electronic processor, an output temperature setpoint, determining, via the electronic processor, whether a period of expected high water demand is approaching, and in response to determining that the period of expected high water demand is approaching, activate the second heating element, and deactivating the second heating element when the second temperature crosses a second temperature threshold. The method further includes activating the first heating element when the second temperature crosses the second temperature threshold, and deactivating the first heating element. Wherein the first temperature threshold is lower than the second temperature threshold and the first and second temperature thresholds are higher than the output temperature setpoint.

Other aspects of the application will become apparent by consideration of the detailed description and accompanying drawings.

BRIEF DESCRIPTION OF THE DRAWINGS

FIG. 5 is a chart comparing various methods of operation of the water heater of FIGS. 1 and 2 according to some embodiments.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
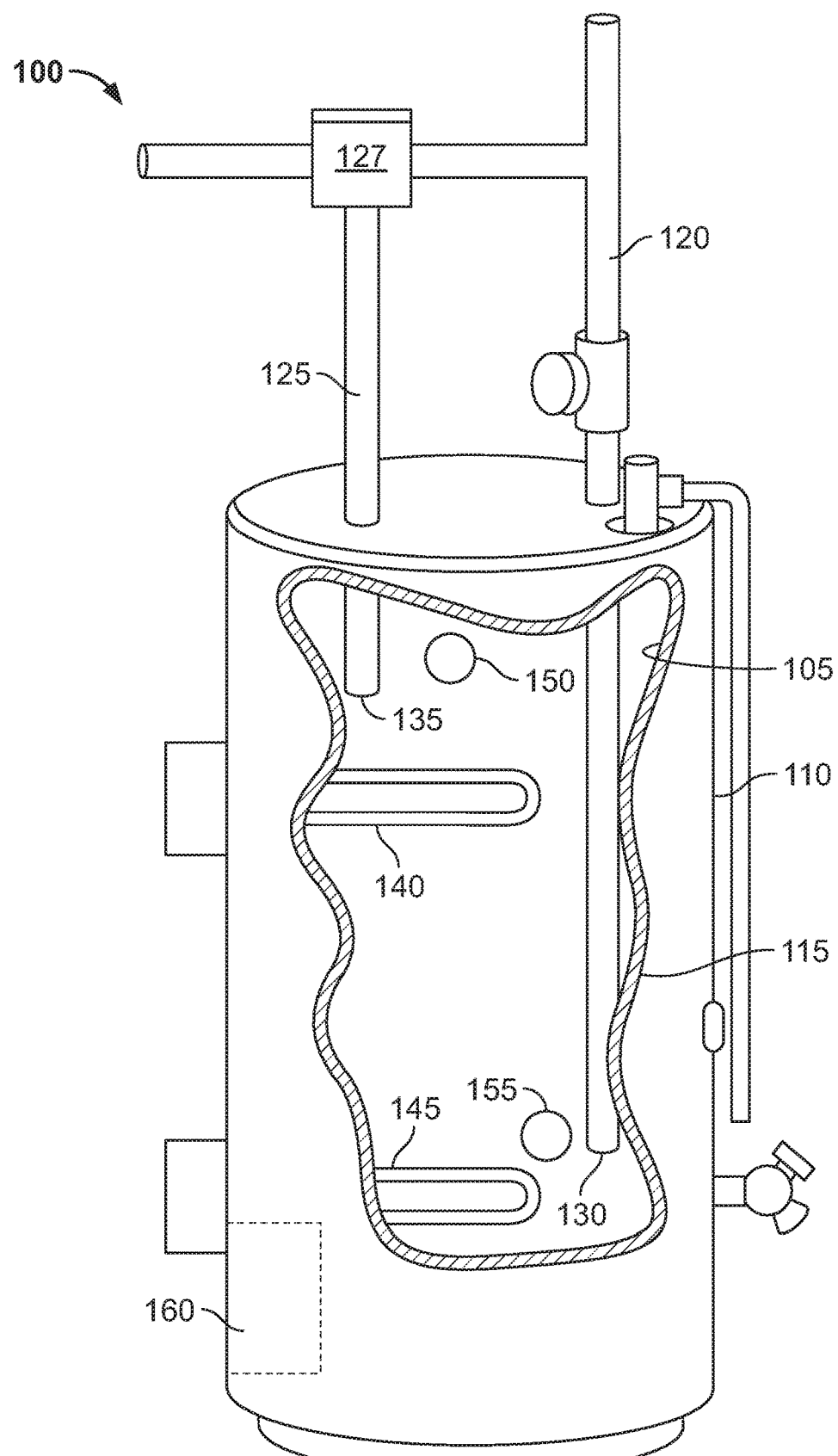
FIG. 1 is a partial exposed view of a water heater according to some embodiments.

FIG. 1 is a partial exposed view of a water heater 100 according to some embodiments of the application. The water heater 100 is configured to manipulate a temperature (for example, increase a temperature) of a fluid (for example, water). The water heater 100 includes an enclosed water tank 105, a shell 110 surrounding the water tank 105, and foam insulation 115 filling an annular space between the water tank 105 and the shell 110. The water tank 105 may be made of ferrous metal and lined internally with a glass-like porcelain enamel to protect the metal from corrosion. In other embodiments, the water tank 105 may be made of other materials, such as plastic.

A water inlet line 120 and a water outlet line 125 may be in fluid communication with the water tank 105 of the water heater 100. In some embodiments, the water inlet line 120 and the water outlet line 125 are in fluid communication with the water tank 105 at a top portion of the water heater 100. In other embodiments, the water inlet line 120 may be at a bottom portion of the water heater 100, while the water outlet line 125 is at the top portion of the water heater 100. The inlet line 120 includes an inlet opening 130 for adding cold water to the water tank 105, and the outlet line 125 includes an outlet opening 135 for withdrawing hot water from the water tank 105 for delivery to a user.

The water heater 100 may also include a mixing valve 127. As shown in FIG. 1, the inlet line 120 and the outlet line 125 may be in fluid communication with the mixing valve 127. The mixing valve 127 combines water from both the inlet line 120 and the outlet line 125 in order to output water at the output temperature setpoint. In some embodiments, the mixing valve 127 may include a sensor, such as but not limited to a water temperature sensor to ensure that the water delivered to the user (for example, via a faucet) is at the output temperature setpoint.

The water heater 100 may further include an upper heating element 140, a lower heating element 145, an upper temperature sensor 150, a lower temperature sensor 155, and an electronic processor 160. The upper heating element 140 is attached to an upper, or first, portion of the water tank 105 and extends into the water tank 105 to heat water within the water tank 105. The upper heating element 140 is coupled to the electronic processor 160 to receive an activation signal. When activated, the upper heating element 140 heats the water stored in an upper portion of the water tank 105. In some embodiments, the upper heating element 140 is an electric resistance heating element.

The lower heating element 145 is attached to a lower, or second, portion of the water tank 105 and extends into the water tank 105 to heat water stored in the lower portion of the water tank 105. The lower heating element 145 is coupled to the electronic processor 160 to receive an activation signal. When activated, the lower heating element 145 heats the water stored in the lower portion of the water tank 105. In some embodiments, the lower heating element 145 is an electric resistance heating element.

Although illustrated as having two heating elements 140, 145, the water heater 100 may have any number of heating elements. The application may also be used with other fluid heating apparatus for heating a conductive fluid, such as a flow-through water heater, a gas water heater, or an oil heater, as well as with other water heaters having other heater element designs and arrangements.

The upper temperature sensor 150 is positioned in the upper portion of the water tank 105 to determine an upper temperature of the water stored in the upper portion of the water tank 105. Analogously, the lower temperature sensor 155 is positioned in the lower portion of the water tank 105 to determine a lower temperature of the water in the lower portion of the water tank 105. In some embodiments, the upper temperature sensor 150 and the lower temperature sensor 155 may be coupled to an exterior or an interior surface of the water tank 105. Additionally, the upper temperature sensor 150 and the lower temperature sensor 155 may be thermistor type sensors, thermocouple type sensors, semiconductor-based sensors, resistance temperature detectors, and the like. The upper temperature sensor 150 and the lower temperature sensor 155 are coupled to the electronic processor 160 to provide temperature information (for example, the sensed upper temperature and the sensed lower temperature) to the electronic processor 160. In some embodiments, the water tank 105 may include one or more additional temperature sensors located at various positions around the water tank 105. For example, the water tank 105 may be divided into three or more portions and a temperature sensor may be positioned in each portion.

Figure 2:
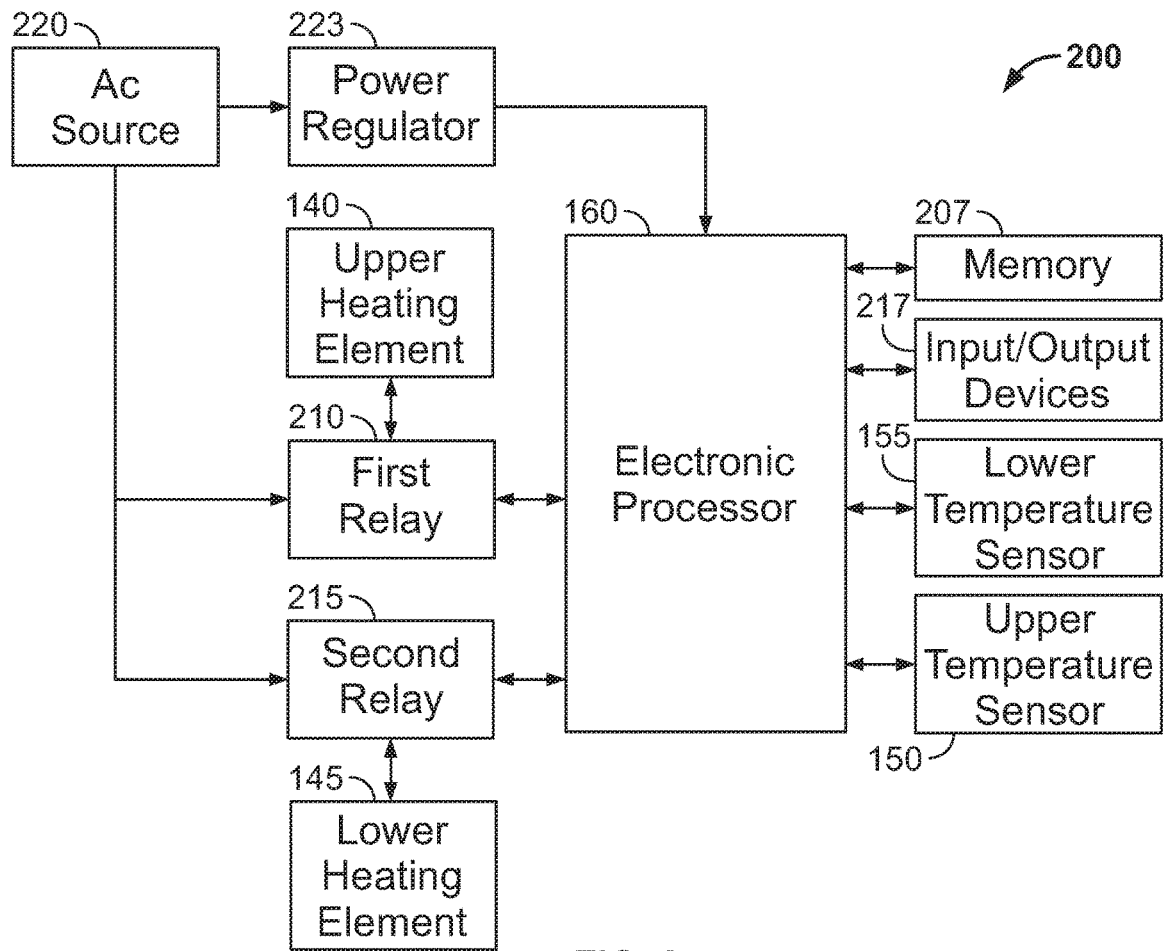
FIG. 2 is a block diagram of a control circuit of the water heater of FIG. 1 according to some embodiments.

FIG. 2 is a block diagram of a control circuit 200 for the water heater 100. As illustrated in FIG. 2, the control circuit 200 includes the electronic processor 160, a memory 207, a first relay 210, a second relay 215, and input/output devices 217. The control circuit 200 receives power from an AC source 220. In one embodiment, the AC power source 220 provides 120 VAC at a frequency of approximately 50 Hz to approximately 60 Hz. In another embodiment, the AC power source 220 provides approximately 220 VAC at a frequency of approximately 50 Hz to approximately 60 Hz. In some embodiments, the control circuit 200 also includes a power regulator 223 that converts the power from the AC power source 220 to a nominal voltage (for example, a DC voltage), and provides the nominal voltage to the control circuit 200 (for example, the electronic processor 160, the input/output devices 217, and the like).

The memory 207 stores algorithms and/or programs used to control the upper heating element 140, the lower heating element 145, and other components of the water heater 100. The memory 207 may also store operational data of the water heater (for example, which heating element 140, 145 has been previously activated, historical data, usage patterns, and the like) to help control the water heater 100.

The electronic processor 160 is coupled to the memory 207, the upper temperature sensor 150, the lower temperature sensor 155, the first relay 210, the second relay 215, the communication interface 205, and the input/output device 217. The electronic processor 160 receives an upper temperature signal (for example, the upper temperature) from the upper temperature sensor 150 and a lower temperature signal (for example, the lower temperature) from the lower temperature sensor 155. In addition, the electronic processor 160 accesses the programs, algorithms, and/or thresholds stored in the memory 207 to control the water heater 100 accordingly. Based on the received temperature signals, the electronic processor 160 generates and outputs a first control signal transmitted to the first relay 210, and a second control signal transmitted to the second relay 215. The first and second control signals indicate to the first relay 210 and second relay 215, respectively, when to transmit driving power to the heating elements 140, 145 (for example, power from the AC power source 220).

The first relay 210 is further coupled to the upper heating element 140. The first relay 210 receives the first control signal via, for example, a first control terminal, from the electronic processor 160. The first relay 210 then transmits driving power, via, for example, a first power output terminal, to the upper heating element 140 according to the first control signal. The second relay 215 is further coupled to the electronic processor 160. The second relay 215 receives the second control signal via, for example, a second control terminal. The second relay 215 then transmits driving power, via, for example, a second power output terminal, to the lower heating element 145 according to the second control signal.

The input/output devices 217 output information to the user regarding the operation of the water heater 100 and also may receive input from the user. In some embodiments, the input/output devices 217 may include a user interface for the water heater 100. The input/output devices 217 may include a combination of digital and analog input or output devices required to achieve level of control and monitoring for the water heater 100. For example, the input/output devices 217 may include a touch screen, a speaker, buttons, and the like, to output information and/or receive user inputs regarding the operation of the water heater 100 (for example, a temperature set point at which water is to be delivered from the water tank 105). The electronic processor 160 controls the input/output devices 217 to output information to the user in the form of, for example, graphics, alarm sounds, and/or other known output devices. The input/output devices 217 may be used to control and/or monitor the water heater 100. For example, the input/output devices 217 may be operably coupled to the electronic processor 160 to control temperature settings of the water heater 100. For example, using the input/output devices 217, a user may set one or more temperature set points for the water heater 100.

The input/output devices 217 are configured to display conditions or data associated with the water heater 100 in real-time or substantially real-time. For example, but not limited to, the input/output devices 217 may be configured to display measured electrical characteristics of the upper heating element 140 and lower heating element 145, the temperature sensed by temperature sensors 150, 155, etc. The input/output devices 217 may also include a "power on" indicator and an indicator for each heating element 140, 145 to indicate whether the element is active.

The input/output devices 217 may be mounted on the shell of the water heater 100, remotely from the water heater 100 in the same room (for example, on a wall), in another room in the building, or even outside of the building. The input/output device 217 may provide an interface between the electronic processor 160 and the user interface that includes a 2-wire bus system, a 4-wire bus system, and/or a wireless signal. In some embodiments, the input/output devices 217 may also generate alarms regarding the operation of the water heater 100.

In some embodiments, the input/output devices 217, the memory 207, and/or other components of the control circuit 200 are modular and separate from the electronic processor 160. In other words, some of the components of the control circuit 200 may be manufactured separately as add-on devices to be connected to the electronic processor 160. In some embodiments, the control circuit 200 may be communicatively coupled to an external device (for example, a wireless control panel, a smartphone, a laptop computer, and the like) through, for example, a remote network, a transceiver, and the like.

Figure 3:
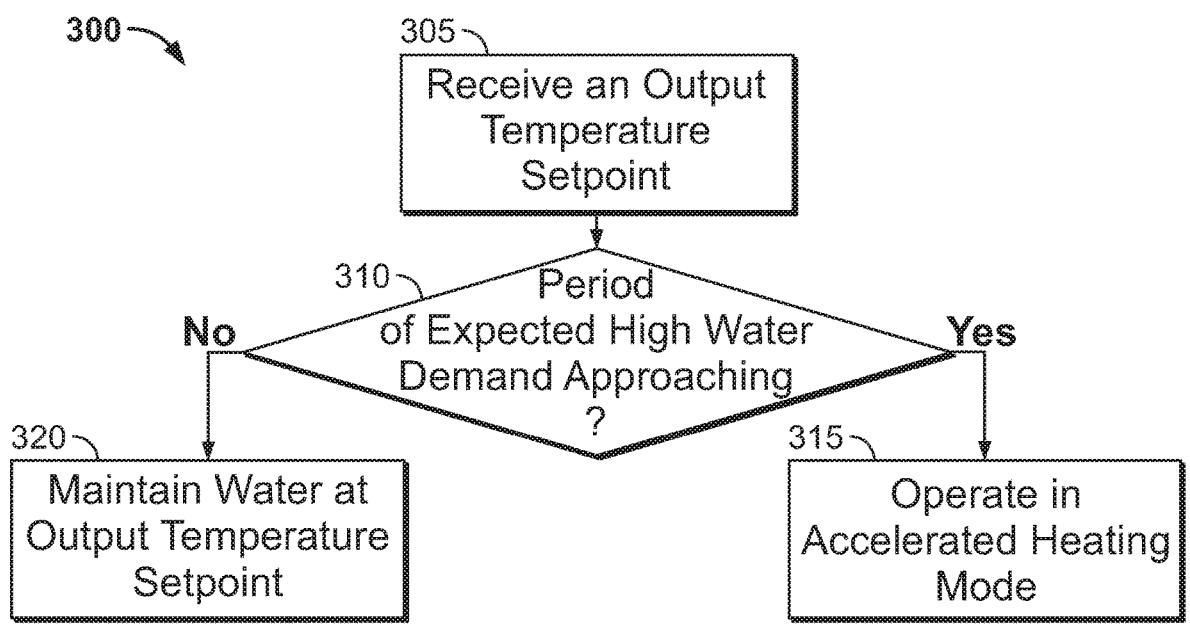
FIG. 3 is a flowchart illustrating a method of operating the water heater of FIG. 1 according to some embodiments.

FIG. 3 is a flowchart illustrating a process, or method, 300 of operating the water heater 100 according to one embodiment of the application. It should be understood that the order of the steps disclosed in method 300 could vary. Additional steps may also be added to the control sequence and not all of the steps may be required. As shown in FIG. 3, initially, the water heater 100 (for example, the electronic processor 160) determines an output temperature setpoint (step 305). The output temperature setpoint identifies the temperature at which hot water is provided to a user (for example, via, for example, a faucet). In one embodiment, the electronic processor 160 receives the output temperature setpoint via, for example, the input/output devices 217. The electronic processor 160 then determines whether a period of high water demand is approaching (step 310). In some embodiments, the memory 207 stores user-defined schedules that indicate periods of expected high water demand. For example, a user may indicate that the periods of expected high water demand include 6 am to 8 am and 5 pm to 7 pm Monday-Friday, and 8 am to 10 am Saturday and Sunday. In such embodiments, the electronic processor 160 determines that a period of high water demand is approaching based on the current day and time. For example, the electronic processor 160 may determine that a period of high water demand is approaching approximately 30 minutes before a user defined period of expected high water demand.

In other embodiments, the electronic processor 160 monitors water usage over a period of time and automatically learns when periods of expected high water demand may occur. In such embodiments, the electronic processor 160 may store the learned period of expected high water demand in the memory 207 and determine when a period of expected high water demand is approaching, for example, approximately 30 minutes before the stored period of expected high water demand. When the electronic processor 160 determines that a period of high water demand is approaching, the electronic processor 160 operates in an accelerated heating mode (step 315). On the other hand, when the electronic processor 160 determines that a period of high water demand is not approaching, the electronic processor 160 maintains the water in the water tank 105 at the output temperature setpoint (step 320). That is, the electronic processor 160 controls the first and second heating elements 140, 145 according to the output temperature setpoint. In one embodiment, the electronic processor 160 does not activate the first heating element 140 or the second heating element 145 unless the water temperature in the water tank 105 drops below 10° F. from the output temperature setpoint. In other embodiments, the electronic processor 160 may use different thresholds (for example, not corresponding to the output temperature setpoint) to control the first and second heating elements 140, 145.

Increasing the temperature at which water is stored in the water tank 105 effectively increases the capacity of the water tank 105 since a greater volume of water may be provided to the user at the output temperature setpoint. However, increasing the temperature at which water is stored in the water tank 105 also increases the energy usage of the water heater 100 and exposes the various parts of the water heater 100 to increased temperatures, which may results in a decrease of the expected life of the water heater 100. Implementing the accelerated heating mode only during period of expected high water demand, allows the water heater 100 to provide the user with an increased capacity of hot water during the periods of expected high water demand, while also reducing some of the detrimental effects of constantly storing the water at an increased temperature in the water tank 105.

Figure 4:
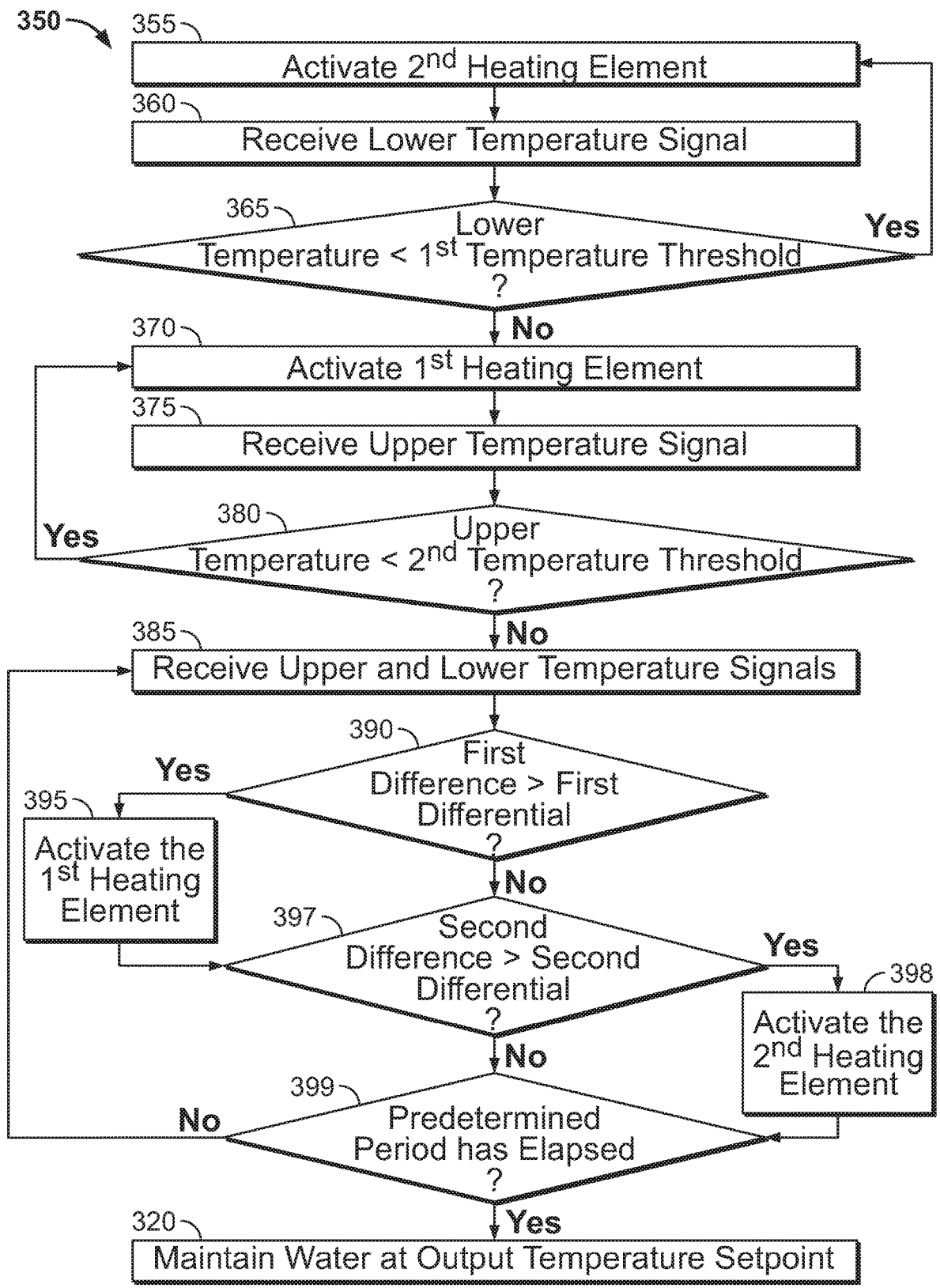
FIG. 4 is a flowchart illustrating a method of implementing an accelerated heating mode of the water heater of FIGS. 1 and 2 according to some embodiments.

FIG. 4 is a flowchart illustrating a method 350 of operating the water heater 100 in the accelerated heating mode as discussed above with respect to step 315 of FIG. 3. When the electronic processor 160 determines that a period of high water demand is approaching, the electronic processor 160 activates the second heating element 145 (for example, the lower heating element) (step 355). In some embodiments, activating the second heating element 145 (for example, the lower heating element) prior to activating the first heating element 140 (for example, the upper heating element) may provide the benefit of stratifying the tank 105 with higher temperatures only at the top, thus causing mixing of the water within the tank 105.

The electronic processor 160 receives a lower temperature signal (i.e., a temperature signal for the lower portion of the water tank 105) from the second temperature sensor 155 (step 360). The electronic processor 160 then determines whether the lower temperature (i.e., the temperature in the lower portion of the water tank 105) has reached a first temperature threshold (step 365). In some embodiments, the first temperature threshold is higher than the output temperature setpoint set by the user. For example, when the output temperature setpoint is approximately 125° F., the first temperature threshold may correspond to 135° F. In some embodiments, the electronic processor 160 calculates the first temperature threshold to be approximately 10-20° F. higher than the output temperature setpoint. In some embodiments, the electronic processor 160 calculates the first temperature threshold to be approximately 8-15% higher (for example, with respect to a reference temperature of 0° F.) than the output temperature output. In other embodiments, the first temperature threshold may have a different relationship with the output temperature setpoint.

While the electronic processor 160 determines that the lower temperature has not reached the first temperature threshold, the electronic processor 160 continues to activate the second heating element 145 (step 355). On the other hand, when the electronic processor 160 determines that the lower temperature reaches the first temperature threshold, the electronic processor 160 proceeds to activate the first heating element 140 (for example, the upper heating element) (step 370). The electronic processor 160 receives an upper temperature signal (i.e., a temperature signal for the upper portion of the water tank 105) from the first temperature sensor 150 (step 375). The electronic processor 160 then determines whether the upper temperature signal has reached a second temperature threshold (step 380). In one example, the second temperature threshold is approximately 170° F. In some embodiments, the electronic processor 160 calculates the second temperature threshold to be approximately 30-45° F. higher than the output temperature setpoint. In some embodiments, the electronic processor 160 calculates the second temperature threshold to be approximately 20-30% higher than the output temperature setpoint (for example, with respect to a reference temperature of 0° F.).

While the electronic processor 160 determines that the upper temperature has not reached the second temperature threshold, the electronic processor 160 continues to activate the first heating element 140 (step 370). When the upper temperature reaches the second temperature threshold, the electronic processor 160 continues to receive the temperature signals from the first and second temperature sensors 150, 155 (step 385). The electronic processor 160 then determines whether a first difference between the upper temperature and the output temperature setpoint is greater than a first differential (step 390). In the illustrated embodiment, the first differential corresponds to, for example, 2° F. When the first difference is greater than the first differential, the electronic processor 160 activates the first heating element 140 to reduce the first difference (step 395). The electronic processor 160 also determines whether a second difference between the lower temperature and the output temperature setpoint is greater than a second differential (step 397). When the second difference is greater than the second differential, the electronic processor 160 activates the second heating element 145 to reduce the second difference (step 398). In the illustrated embodiment, the lower differential corresponds to, for example, 10° F. The lower differential is greater than the upper differential, which allows the water in the upper region of the water tank 105 to be maintained at a temperature closer to the output temperature setpoint while the water in the lower region of the water tank 105 can be stored at a lower temperature. Storing the water in the lower region of the water tank 105 at a lower temperature requires less energy than storing all the water in the water tank 105 at the output temperature setpoint.

The electronic processor 160 continues to control the first and second heating elements 140, 145 based on the upper differential and the lower differential for a predetermined time period. Accordingly, the electronic processor 160 determines whether the predetermined time period has elapsed (step 399). While the electronic processor 160 determines that the predetermined time period has not elapsed, the electronic processor 160 continues to control the first and second heating elements 140, 145 according to the upper differential and the lower differential. When the electronic processor 160 determines that the predetermined period has elapsed, the electronic processor 160 proceeds to maintain the water in the water tank 105 at the output temperature setpoint as described above with respect to step 320 in FIG. 3. Controlling the first and second heating elements based on the upper and lower differentials allows the water heater 100 to lower its energy usage (for example, since the water in the lower portion of the water tank 105 may remain at a lower temperature) while, at the same time, allowing the water heater 100 to react quickly when a larger than expected water draw occurs. For example, if a larger than expected water draw occurs, the water in the upper portion of the water tank 105 is able to rapidly heat up to the output temperature setpoint (for example, since the first differential is less than the second differential).

In the example described above with respect to FIG. 4, the difference between the first temperature threshold (for example, 135° F.) and the second temperature threshold (for example, 170° F.) is approximately 35° F. As discussed above, heating the water in the water tank 105 to a higher temperature than the output temperature setpoint increases the water available to the user at the output temperature setpoint. In some embodiments, a difference between the first temperature threshold and the second temperature threshold may be smaller. For example, the first temperature threshold may be 155° F. while the second temperature threshold may be 163° F. In such embodiments, the water in the water tank 105 is more evenly heated which may increase the overall water available to the user at the output temperature setpoint, but also increases the energy consumption of the water heater 100 since both the first and the second heating elements 140, 145 would be activated more often.

FIG. 5 illustrates a chart comparing various methods of operating the water heater 100. The first method corresponds to setting the first and second temperature thresholds to the output temperature setpoint. In such a method, the water in the water tank 105 is stored at the output temperature setpoint and the mixing valve 127 may not be necessary. Using the first method and after a first draw of 35 gallons was performed, a total of 61.6 gallons of water were available at the output temperature setpoint during a single hour. Additionally, the average water temperature in the water tank 105 during the first hour was approximately 105° F. In a test of the first method, three different draws of 35 gallons each were performed. An average upper temperature was then calculated after each of the three draws. The average upper temperature after a draw is about 124° F. In comparison, the chart of FIG. 5 also illustrates statistics associated with the accelerated heating method of FIG. 4. Implementing the accelerated heating method and after withdrawing 46.9 gallons from the water tank 105, a total of 77.4 gallons of water were available at the output temperature setpoint during a single hour. Additionally, the average water temperature in the water tank 105 during the first hour was approximately 114.5° F. The average water temperature is higher using the accelerated heating method than the first method because the first temperature threshold and the second temperature threshold are higher than the output temperature setpoint. In a test of the accelerated heating method, three different draws of about 47 gallons each were performed. An average upper temperature was then calculated after each of the three draws. The average upper temperature after a draw is about 125° F.

FIG. 5 also compares an extra-accelerated heating method. The extra-accelerated heating method operates similar to the accelerated heating method as described with respect to FIG. 4, but the first temperature threshold and the second temperature threshold are closer to each other. For example, the first temperature threshold is approximately 155° F. while the second temperature threshold is approximately 163° F. While implementing the extra-accelerated heating method and performing a first draw of about 55.2 gallons, the extra-accelerated heating method provided about 81 gallons at the output temperature setpoint during a single hour. Additionally, the average water temperature in the water tank 105 during the first hour was approximately 123.1° F. In a test of the extra-accelerated heating method, three different draws of about 55 gallons each were performed. An average upper temperature was then calculated after the three draws. The average upper temperature after a draw is about 149.2° F. Heating the water in the water tank 105 more evenly as suggested by implementing the extra-accelerating heating method allows the water heater 100 to provide a greater capacity of water at the output temperature setpoint. Heating the water more evenly through the water tank 105, however, may also increase energy losses and costs associated with energy usage. Accordingly, the accelerated heating method provides the water heater 100 with an ability to effectively increase the overall capacity of the water tank 105 (for example, the same capacity water tank can deliver a greater volume of water at the output temperature setpoint when implementing the accelerating heating method), while also maintaining the energy usage of the water heater 100 at a reduced level.

Thus, this application describes, among other things, a water heater that accelerates heating of a fluid (for example, water) within a tank.

What is claimed is:
1. A water heating system comprising:
   a tank;
   a first heating element coupled to an upper portion of the tank;
   a second heating element coupled to a lower portion of the tank;
   a first temperature sensor configured to sense a first temperature of fluid within the upper portion of the tank;
   a second temperature sensor configured to sense a second temperature of fluid within the lower portion of the tank; and
   a controller having an electronic processor and a memory, the controller configured to:
      receive the first temperature from the first temperature sensor;
      receive the second temperature from the second temperature sensor;
      determine an output temperature setpoint; and
      determine whether a period of expected high water demand is approaching, and in response to determining that a period of expected high water demand is approaching:
         set a first temperature threshold higher than the output temperature setpoint,
         set a second temperature threshold higher than the first temperature threshold,
         operate the second heating element until the second temperature reaches the first temperature threshold,
         operate the first heating element after the second temperature reaches the first temperature threshold until the first temperature reaches the second temperature threshold, and
         maintain the fluid within the lower portion of the tank at a lower temperature than the fluid within the upper portion of the tank during the period of expected high water demand.

2. The water heating system of claim 1, further comprising an input/output device operably coupled to the controller and configured to provide the output temperature setpoint to the controller.

3. The water heating system of claim 1, wherein the controller is further configured to compare a current day and time to one or more schedules stored in the memory in order to determine whether the period of expected high water demand is approaching.

4. The water heating system of claim 1, wherein the controller is further configured to monitor water usage over a period of time in order to determine whether the period of expected high water demand is approaching.

5. The water heating system of claim 1, wherein the controller is further configured to maintain the fluid at the output temperature setpoint after determining that the period of expected high water demand has elapsed.

6. The water heating system of claim 1, wherein the second temperature threshold is at least 30° F. higher than the predetermined setpoint temperature.

7. The water heating system of claim 1, wherein the first temperature threshold is at least 10° F. higher than the predetermined setpoint temperature.

8. The water heating system of claim 1, wherein the first temperature threshold is no more than 30° F. higher than the predetermined setpoint temperature.

9. The water heating system of claim 1, wherein a difference between the predetermined setpoint temperature and the first temperature threshold is greater than a difference between the first temperature threshold and the second temperature threshold.

10. A method of heating a fluid within a tank, comprising:
    determining, via an electronic processor, that a period of expected high water demand is approaching;
    determining, via the electronic processor, a predetermined setpoint temperature;
    setting a first and a second temperature threshold, the first temperature threshold being higher than the predetermined setpoint temperature and the second temperature threshold being higher than the first temperature threshold;
    activating a lower heating element of the tank until a lower temperature of the tank reaches the first temperature threshold; and
    activating an upper heating element of the tank after the lower temperature reaches the first temperature threshold, until an upper temperature of the tank reaches the second temperature threshold.

11. The method of claim 10, wherein the second temperature threshold is at least 30° F. higher than the predetermined setpoint temperature.

12. The method of claim 11, wherein the first temperature threshold is at least 10° F. higher than the predetermined setpoint temperature.

13. The method of claim 12, wherein the first temperature threshold is no more than 30° F. higher than the predetermined setpoint temperature.

14. The method of claim 11, wherein a difference between the predetermined setpoint temperature and the first temperature threshold is greater than a difference between the first temperature threshold and the second temperature threshold.

15. The method of claim 10, further comprising:

during the period of expected high water demand, calculating a first difference between the predetermined setpoint temperature and the upper temperature of the tank and a second difference between the predetermined setpoint temperature and the lower temperature of the tank; and during the period of expected high water demand, activating the upper element only when the first difference exceeds a first differential and activating the lower element only when the second difference exceeds a second differential, wherein the second differential is greater than the first differential.

16. The method of claim 15, wherein the second differential is at least 10° F.

17. The method of claim 10, further comprising:

determining that the period of expected high water demand has elapsed; and maintaining the temperature of fluid within the tank at the predetermined setpoint temperature after determining that the period of expected high water demand has elapsed.

18. The method of claim 10, wherein the step of determining that a period of expected high water demand is approaching includes determining a current day and time, and comparing the current day and time to one or more stored schedules.

19. The method of claim 10, wherein the step of determining that a period of expected high water demand is approaching includes:

monitoring water usage over a period of time to learn when periods of expected high water demand may occur;

storing the periods of expected high water demand in a memory;

determining a current day and time; and comparing the current day and time to the periods stored in the memory.

* * * * *